United States Patent

[11] 3,603,619

[72] Inventors Karl Bengesser
Fraghes No. 6, Klausen, Province of Bolzano, Italy;
Karl Garbislander, Mitterweg 95, Innsbruck, Austria
[21] Appl. No. 839,210
[22] Filed July 7, 1969
[45] Patented Sept. 7, 1971
[32] Priority Feb. 26, 1969
[33] Austria
[31] A 1931/69

[54] CLAMP COUPLING
4 Claims, 10 Drawing Figs.

[52] U.S. Cl. ...................................................... 285/45, 285/321, 285/369
[51] Int. Cl. ...................................................... F16l 11/12
[50] Field of Search .......................................... 285/305, 321, 340, 308, 305, 104, 105, 113, 45, 6 R, 369; 248/410; 24/24 SA

[56] References Cited
UNITED STATES PATENTS

| | | | |
|---|---|---|---|
| 2,447,221 | 8/1948 | Worring .................... | 285/340 X |
| 2,691,537 | 11/1954 | Bashark .................... | 285/340 |
| 3,314,696 | 4/1967 | Ferguson et al. .......... | 285/174 |
| 3,427,051 | 2/1969 | White et al. .............. | 285/302 X |
| 3,456,963 | 7/1969 | Dillon ....................... | 285/321 X |

FOREIGN PATENTS

| | | | |
|---|---|---|---|
| 571,643 | 9/1945 | Great Britain ............. | 285/320 |
| 6,711,594 | 3/1968 | Netherlands .............. | 285/320 |

*Primary Examiner*—Dave W. Arola
*Attorney*—Waters, Roditi, Schwartz & Nissen

ABSTRACT: A quick-connect pipe coupling consisting of a socket having three inner sections of different bore diameters, at least one clamping ring and one seal O-ring positioned within the bores, whereby the two radially extending free ends of the clamping ring extend through and may be operated in apertures located in the wall of the socket.

CLAMP COUPLING

This invention relates to improvements for a pipe coupling incorporating wedging action for the quick connection of pipes or tubes with each other, the tubes or pipes being preferably formed of plastic material, or for the connection of pipes with other members such as hydraulic valves, transition pieces, branch pipes and T-pipes.

The coupling incorporates a socket with inner sections having different bore diameters, and including one or more packing and clamping rings positioned within the socket and adapted to be mounted on the parts to be held.

A quick-connect coupling has been previously known, particularly for frame supporting devices, wherein one coupling part, in which a second part is adjustably inserted, supports a screw cap which by a clamping motion tilts a bevelled ring surrounding the second coupling part between its collar, and the coupling part supporting it, towards the circumference of said second coupling part. Such a coupling can, however, be used only when the forces acting at the coupling are relatively low, since the clamping tension is easily overcome by bigger forces.

According to a known design for the quick connection of pipes, the pipe parts that are to be joined are inserted in the coupling part from both ends, whereby spring-loaded rings lying in slots of the coupling part embrace the pipe ends and securely hold the inserted pipes in an inclined position. Packings are usually arranged between the two rings, ensure that no gas or liquid can escape from the coupling element.

Such a coupling is subject to the disadvantage that the springs are accessible from the outside and can be easily pressed aside since it is possible, for instance when the coupling is lying in or on the ground, to counteract the clamping effect, thereby allowing the pipe to be pulled out of the coupling part. This prior art coupling can also only be used when pipes with the same diameter are to be connected, in effect, it cannot be used for the connection of pipes with other types of structural members.

Accordingly, it is an object of the invention to provide a simple, inexpensive clamp coupling that can be readily manipulated without the use of tools, and through which a fluid and gas impervious connection of pipes and tubes is facilitated.

It is also another object of the invention to provide a coupling whereby the grip on the pipe or tube held by the clamp cannot be accidentally loosened.

Yet another object of the invention is to provide a coupling whereby the grip on the inserted tube or pipe is increased in proportion to an exerted external pull on the inserted tube or pipe.

These and other objects will be more apparent from the following description and attached drawings in which.

Figure 1:
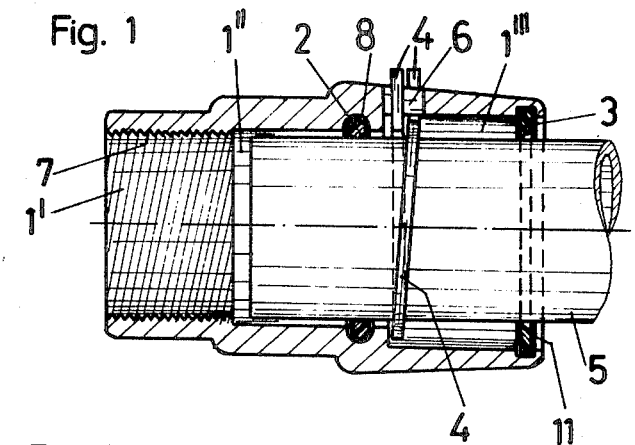
FIG. 1 is a longitudinal sectional view of a tube coupling according to the invention.

According to FIG. 1 the quick-connect coupling consists of a socket 1 comprising three internal bore portions 1', 1'', 1''', of cylindrical shape that have different or stepped bore diameters. The portion 1' having the smallest radius includes an internal thread 7 by which it can be firmly connected with a connecting part. Any other type of fastening would be also suitable as, for example, a bayonet joint.

The bore portion 1'' of the intermediate size bore diameter contains a packing ring 2 positioned in a groove 8, with the packing ring 2 positioned tightly against the periphery inserted tube 5, and so rendering the coupling fluid or gas impervious.

Figure 5:
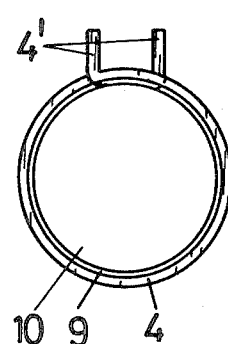
Figure 6:
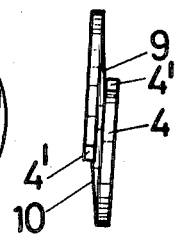

The bore portion 1''' has the largest bore width. It contains a helical clamping ring 4 whose free ends 4' project through trapezoidal apertures 6 in the wall of the portion 1''', so as to form handles which can be pressed together. Near the free ends 4' the helical ring 4 overlaps as can be seen in the Figures 3 to 6, and with the helical ring loops resting against each other. Within the scope of the invention, apertures 6 can be merely clearances in the wall of the portion 1''' without extending to the exterior of the wall, since the trapezoidal form of the apertures ensures the tilting and the clamping action of the ring 4, even if its ends 4' are not guided from the exterior. One embodiment of the ring 4 is shown in the FIGS. 5 and 6. Here the ring 4, preferably consisting of profile or sectional steel, includes an inside peripheral wall 9 that increases conically in the direction of the coupling inlet end. Upon tilting of the clamping ring, the edge of the smaller rim 10 of the wall 9 is forced into the surface of the tube 5 like a knife edge and so ensures a firm clamping thereof.

At the coupling inlet, near the outer edge of the bore portion 1''', a ring groove 11 may be provided in which a snapring 3 is inserted. In this manner, no dirt can enter the coupling after the insertion of the tube 5.

In order to couple a tube 5 with the socket 1, the tube is inserted into the bore portion 1'''. This is facilitated by the conical inside wall 9 of the clamping ring 4 according to the special configuration shown in FIGS. 5 and 6. The clamping ring is widened upon insertion of the tube and rests prestressed against the outer wall of the tube. If the ring ends 4' extend to the outside of the socket and are formed into handles or grips, the insertion of the tube 5 is particularly simple, because the ring diameter is limited by the play afforded by openings 6, and can be extended by pressing the ring ends 4' together. Upon withdrawal of the inserted tube 5 the clamping ring is pulled along by its frictional contact therewith and is tilted. The ring ends 4' are drawn into the trapezoidal apertures 6 which spread the ends 4' so as to press the inside wall 9 of the ring 4 against the surface of the tube to be connected to the coupling.

Figure 2:
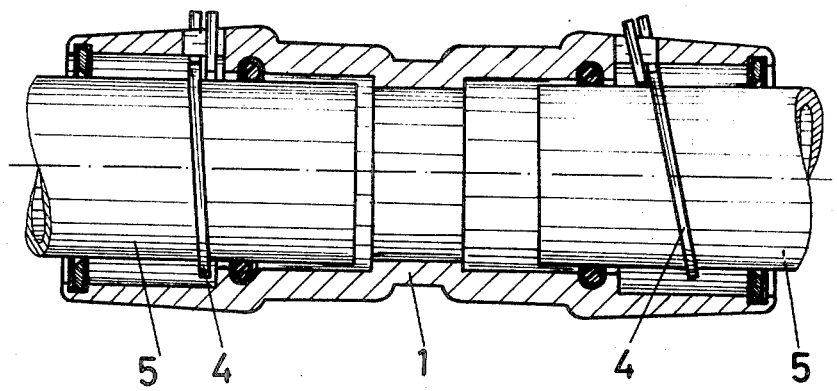
FIG. 2 shows a sectional view of a further embodiment of the invention.
Figure 3:
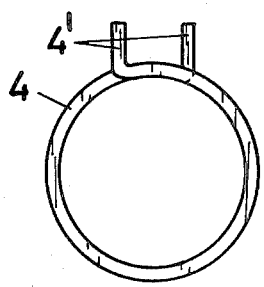
FIGS. 3 to 6 show two embodiments, in front and side views, of a clamping ring according to the invention.
Figure 4:
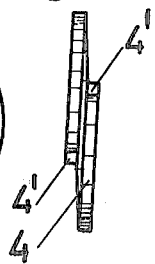
Figure 7:
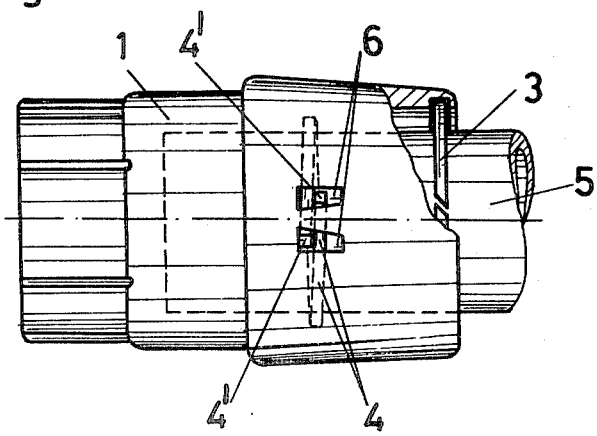
FIG. 7 is a top view of a coupling socket, partly in section, illustrating an inserted snap ring.
Figure 8:
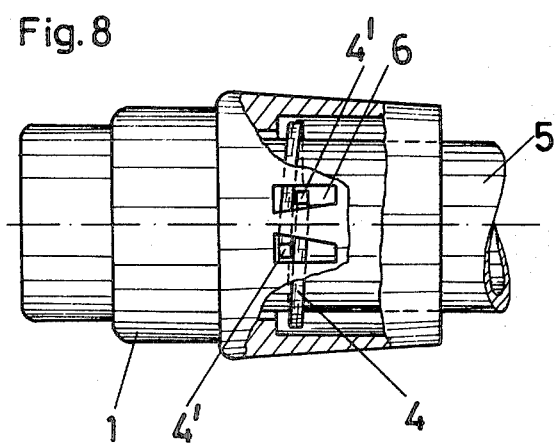
FIGS. 8 and 9 show top views of a socket, partly in section, in open and in clamping position.
Figure 9:
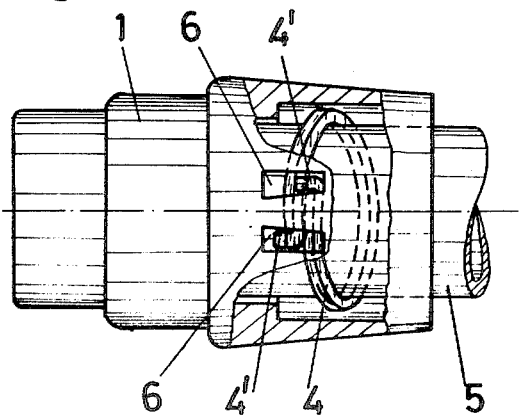
Figure 10:
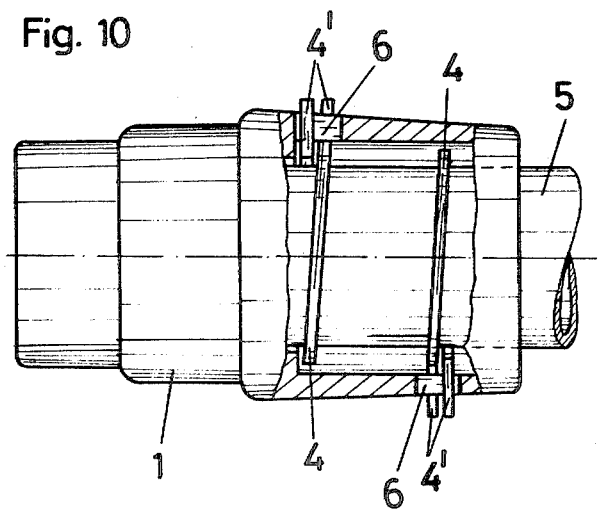
FIG. 10 shows a coupling socket with two clamping rings.

The embodiments illustrated in the FIGS. 2 and 7 to 10 show in principle the same construction as the previous embodiment. FIG. 2 shows a double socket 1, wherein the thread 7 can be omitted since two reverse identical socket parts are joined together. FIG. 7 is a top view of a socket 1 shaped like that in FIG. 1, but is shown partly in section in order to illustrate the inserted snapring ring 3. The FIGS. 8 and 9 illustrate a similar coupling with unlocked and locked positions of the clamping ring 4. FIG. 10 shows a configuration of a socket 1, wherein in the bore portion 1''' two peripherally offset clamping rings 4 are inserted with their free ends thus pointing in opposite radial directions, whereby the advantage obtained can easily be ascertained. The axial distance of the two clamping rings 4 from each other in the bore corresponds essentially to the axial tilting distance between the rings 4, at an inclination of about 20° from the vertical position of the rings.

Since many different embodiments of this invention may be formed without departing from the spirit and scope thereof, it is to be understood that the specific embodiments described in detail herein are not to be taken in a limiting sense.

We claim:

1. An improved quick-connect coupling, the coupling comprising a socket having wall means forming three inner sections of stepped bore diameters, said coupling including a packing ring and at least one helically formed clamping ring adapted to be slideably mounted on the part to be connected to said coupling, said clamping ring having a relaxed inner diameter smaller than the outer diameter of the part to be connected to said coupling, a groove, the packing ring being positioned in said groove, in the intermediately sized bore portion of the socket section, positioning means for guiding the clamping ring into clamping position, the socket section having the smallest bore diameter including an internal thread for connecting the coupling with a connecting part, the improvement comprising at least one said clamping ring being positioned in the section having the largest bore diameter, the clamping ring having free ends which cross one over the other and then extend radially outwardly so as to project through said positioning means, said positioning means including trapezoid apertures located in the wall of the section having said largest bore diameter, said free ring ends being movable within the apertures, and said apertures narrowing in direction of the socket inlet end whereby when said ring is moved toward said inlet end said free ends will be moved further apart resulting in a decrease of the inner diameter of said ring.

2. A pipe coupling as claimed in claim 1, wherein the clamping ring is preferably formed of steel, said ring comprising in section a conical inner periphery, whereby the innermost circumferential edge is prestressedly positioned on the peripheral wall of the inserted tube or pipe.

3. A pipe coupling as claimed in claim 1, including two substantially identical clamping rings positioned in spaced relationship in the socket section having the largest bore diameter, said clamping rings being rotatably offset relative to each other so that their respective free ends extend in opposite radial directions, and their axial distances from each other are determined in response to their inclination of about 20° from the vertical position in said bore.

4. A pipe coupling as claimed in claim 1, including a snapring adapted to be inserted in an annular slot adjacent to the inlet end of the section having the largest bore diameter.